(12) United States Patent
Louden

(10) Patent No.: US 7,513,219 B2
(45) Date of Patent: Apr. 7, 2009

(54) FEED DISH FOR ANIMAL CAGES

(75) Inventor: Richard E. Louden, North Lewisburg, OH (US)

(73) Assignee: Louden Bros. Tool Co., Inc., North Lewisburg, OH (US)

( * ) Notice: Subject to any disclaimer, the term of this patent is extended or adjusted under 35 U.S.C. 154(b) by 221 days.

(21) Appl. No.: 10/951,998

(22) Filed: Sep. 28, 2004

(65) Prior Publication Data

US 2006/0065207 A1    Mar. 30, 2006

(51) Int. Cl.
*A01K 5/01* (2006.01)
*A01K 39/01* (2006.01)

(52) U.S. Cl. .................... 119/477; 119/51.01

(58) Field of Classification Search .......... 119/51.01, 119/464, 477
See application file for complete search history.

(56) References Cited

U.S. PATENT DOCUMENTS

| | | | |
|---|---|---|---|
| 2,773,473 A | 12/1956 | Martin | |
| 2,979,301 A | 4/1961 | Reveal | |
| 3,025,122 A | 3/1962 | Millman | |
| 3,185,133 A | 5/1965 | Bird | |
| 3,299,839 A | 1/1967 | Nordbak | |
| 3,477,677 A | 11/1969 | Hindley | |
| D230,032 S * | 1/1974 | Robert | D30/133 |
| 4,995,337 A * | 2/1991 | Abrams et al. | 119/477 |
| 5,018,480 A * | 5/1991 | Goldman et al. | 119/468 |
| 5,228,411 A * | 7/1993 | O'Rourke | 119/468 |
| 5,323,733 A * | 6/1994 | Youngs-McVicker | 119/464 |
| 5,351,645 A | 10/1994 | Brennon | |
| 5,467,733 A * | 11/1995 | Messina | 119/464 |
| 5,476,733 A | 12/1995 | Coetzer et al. | |
| 5,549,074 A | 8/1996 | Hui | |
| 5,669,329 A | 9/1997 | Krause | |
| 5,713,305 A * | 2/1998 | Hollaway et al. | 119/464 |
| 5,832,872 A | 11/1998 | Pearce | |
| 5,855,184 A * | 1/1999 | Eichler et al. | 119/51.5 |
| 5,870,969 A * | 2/1999 | Boyce | 119/61.3 |
| 6,082,573 A | 7/2000 | Hofman et al. | |
| 6,189,489 B1 * | 2/2001 | Pearce | 119/477 |
| 6,199,510 B1 * | 3/2001 | Louden | 119/51.01 |
| 6,227,400 B1 | 5/2001 | Paladino | |
| 6,427,958 B1 * | 8/2002 | Looney | 248/220.21 |
| 6,526,911 B2 * | 3/2003 | Louden | 119/51.01 |

FOREIGN PATENT DOCUMENTS

JP          6054720          3/1994

* cited by examiner

*Primary Examiner*—Francis T Palo
(74) *Attorney, Agent, or Firm*—Jacox, Meckstroth & Jenkins

(57) ABSTRACT

A feed dish for use in combination with a cage. The feed dish has at least one or a plurality of protrusions or elongated members that are capable of receiving a sliding member in adjustable positions so that the feed dish can be mounted on cages comprising on cage walls having different widths, thickness or sizes.

21 Claims, 5 Drawing Sheets

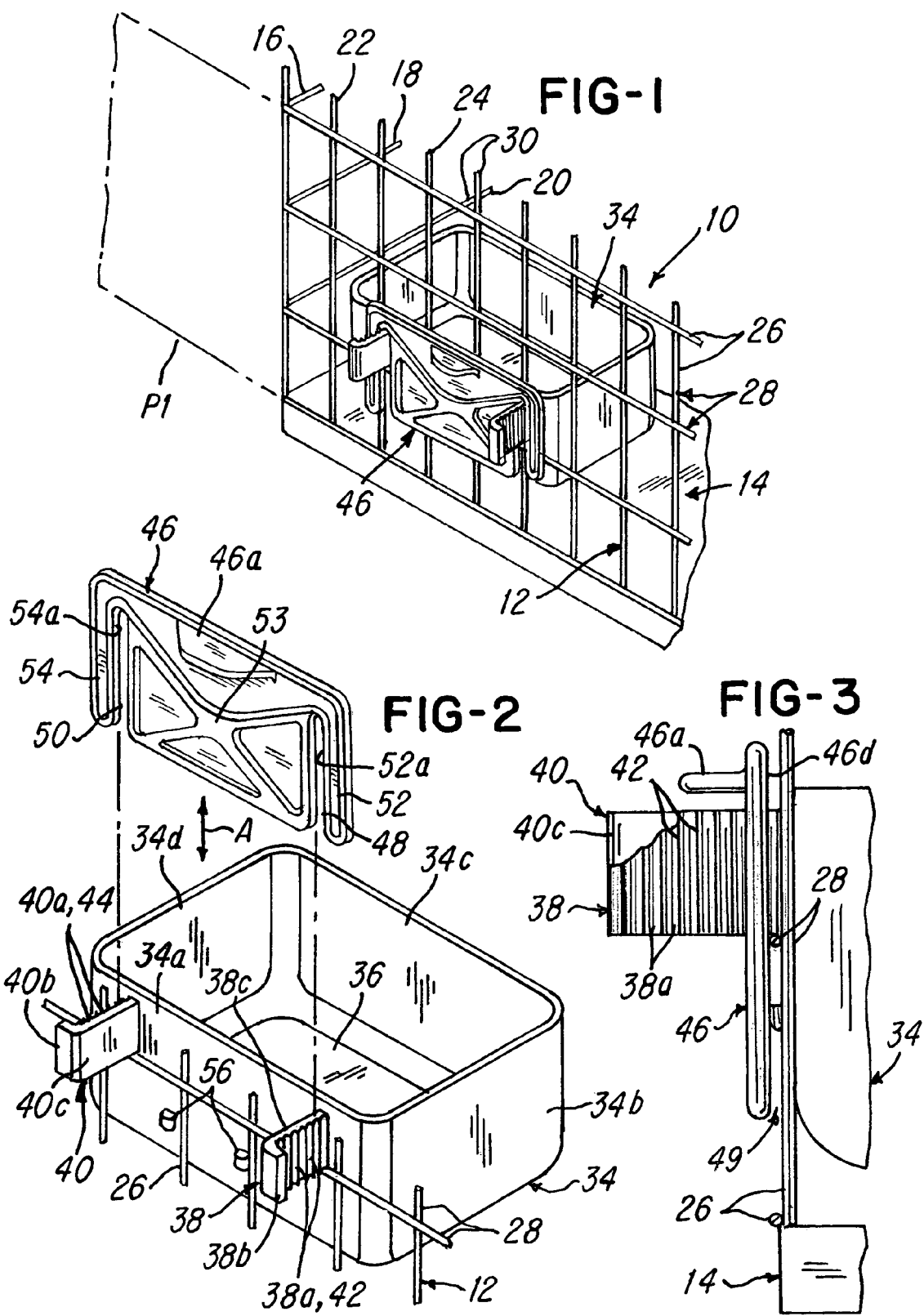

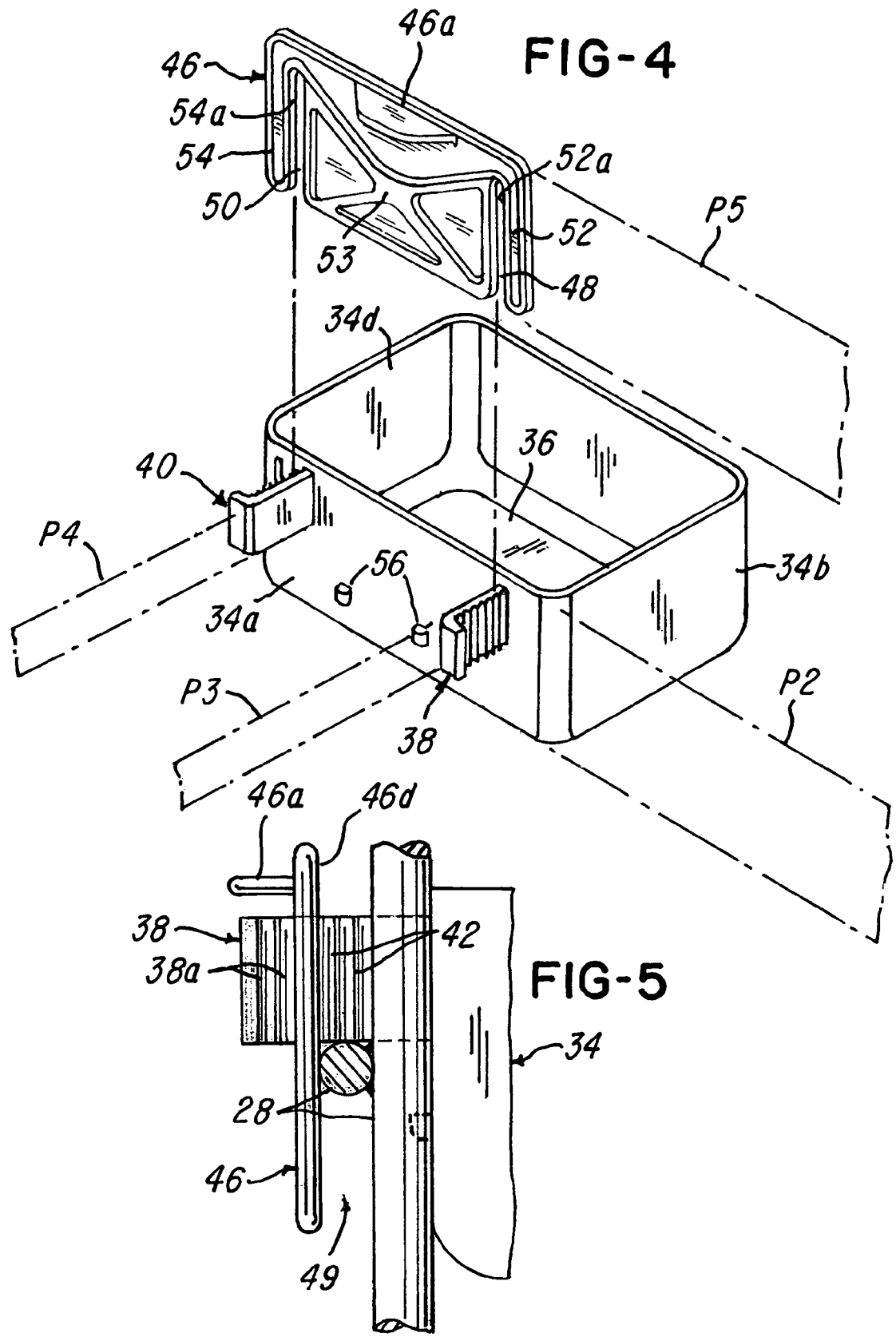

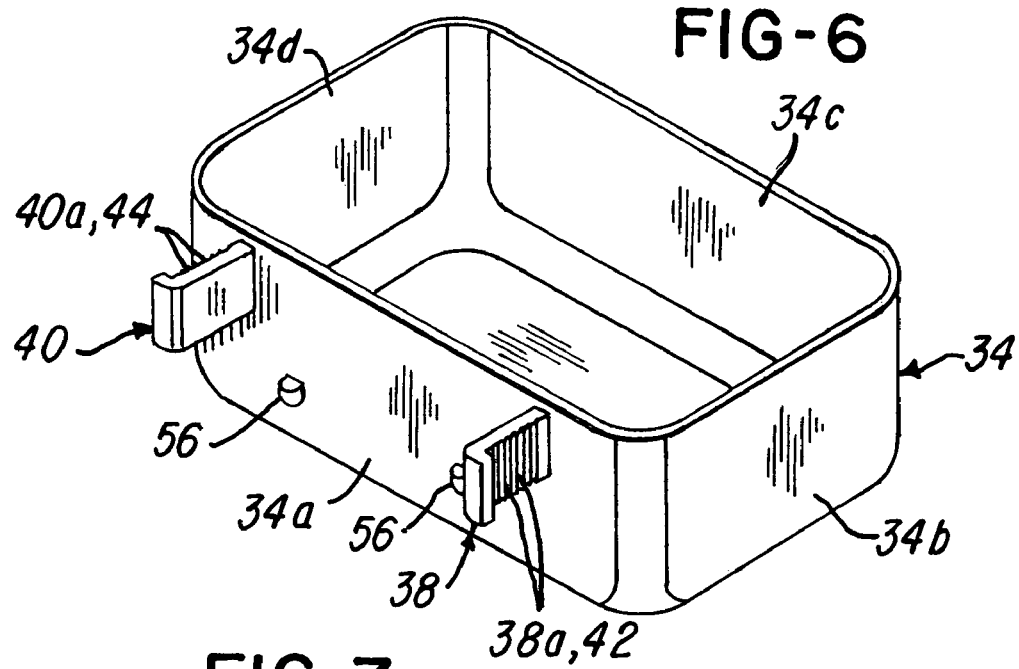
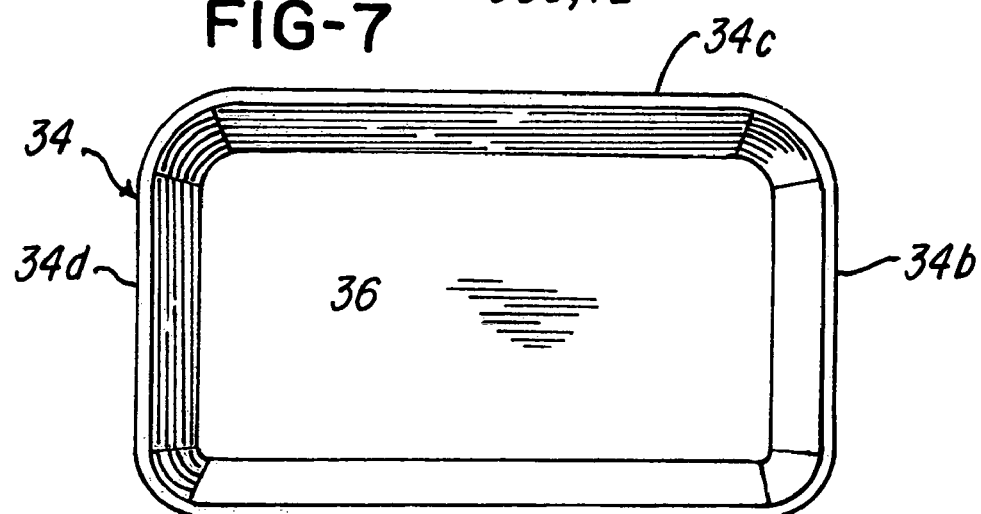
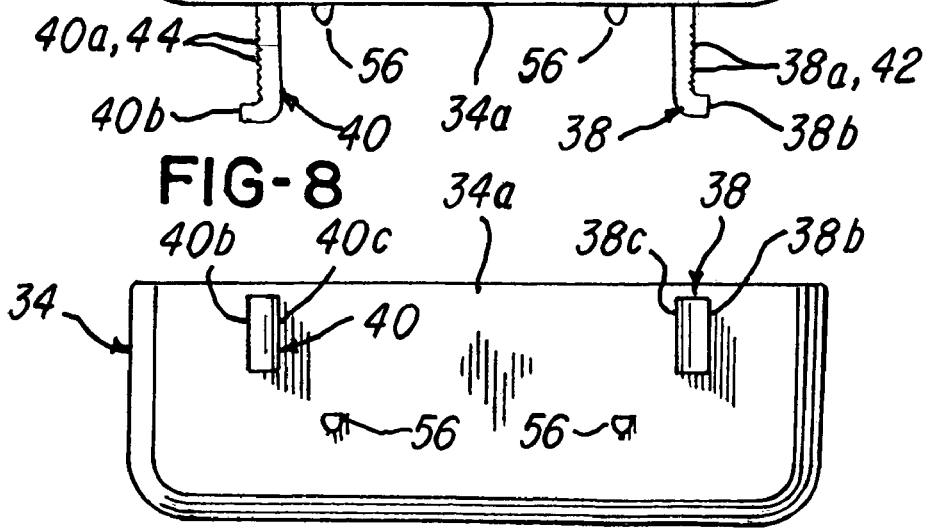

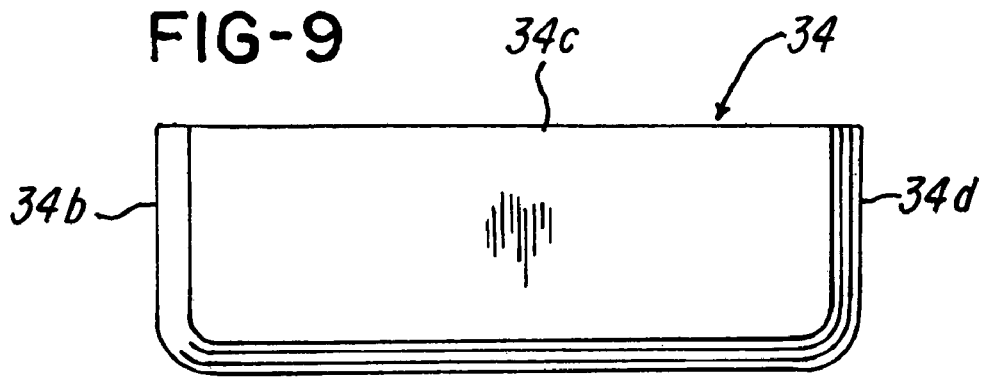
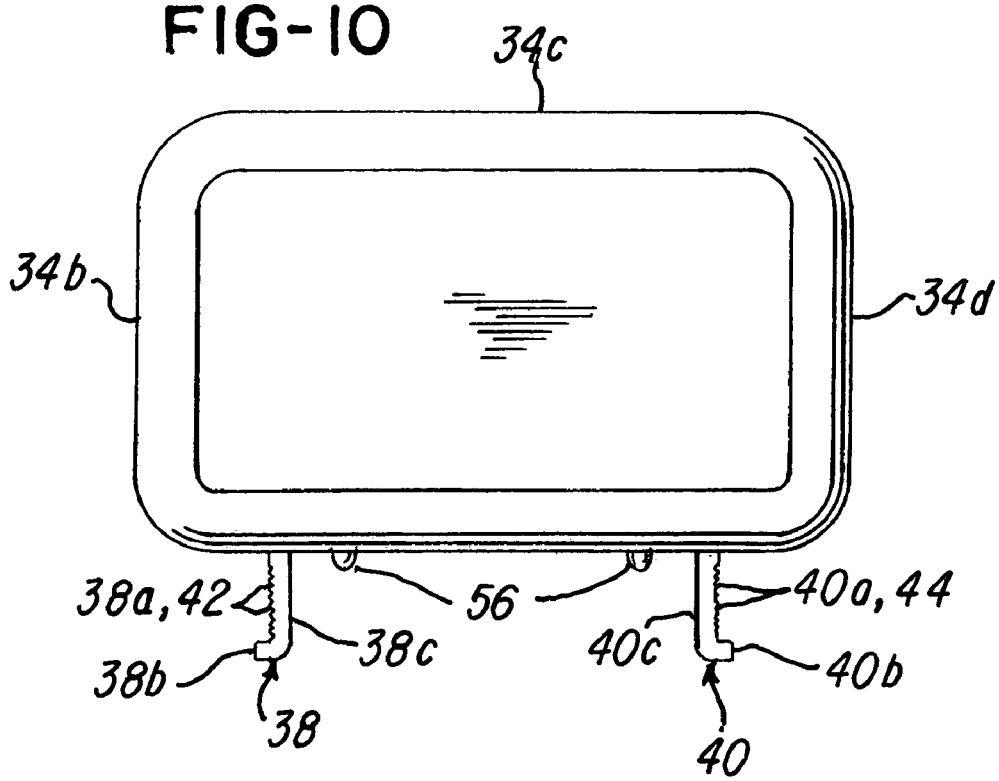
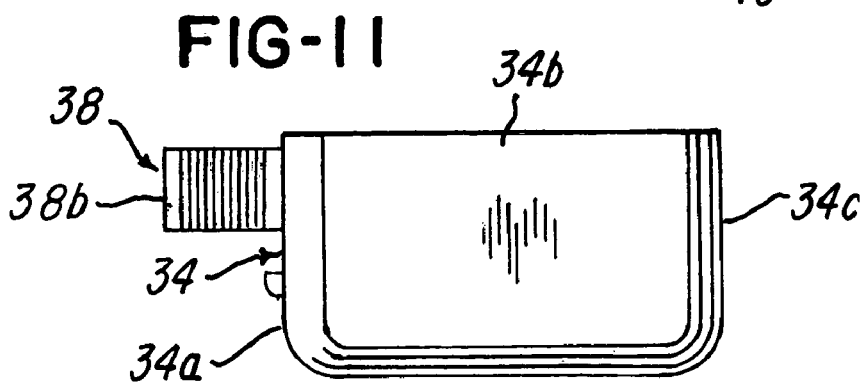

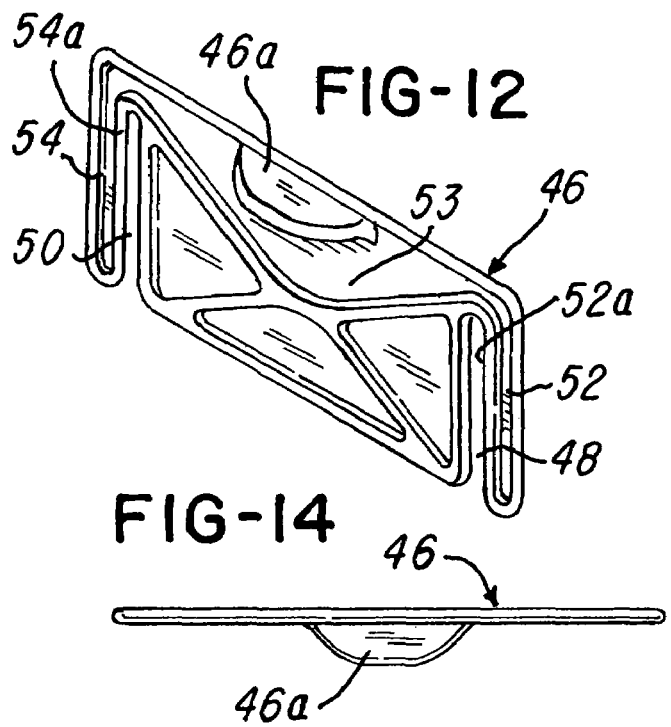
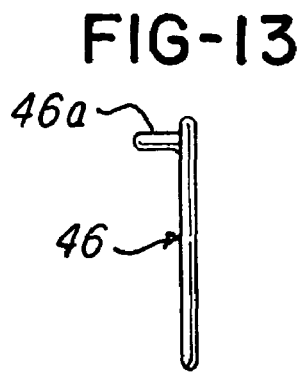
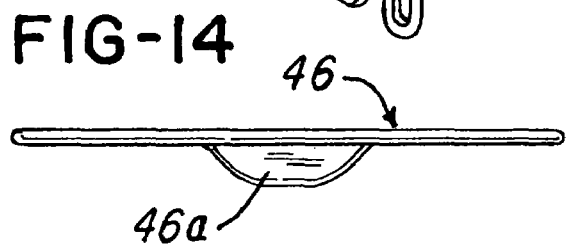
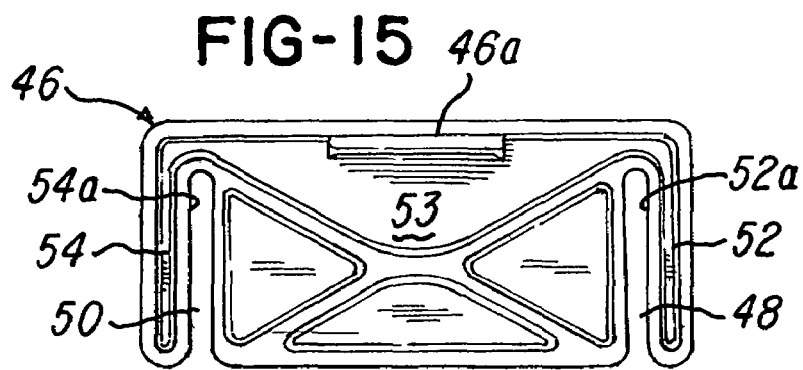
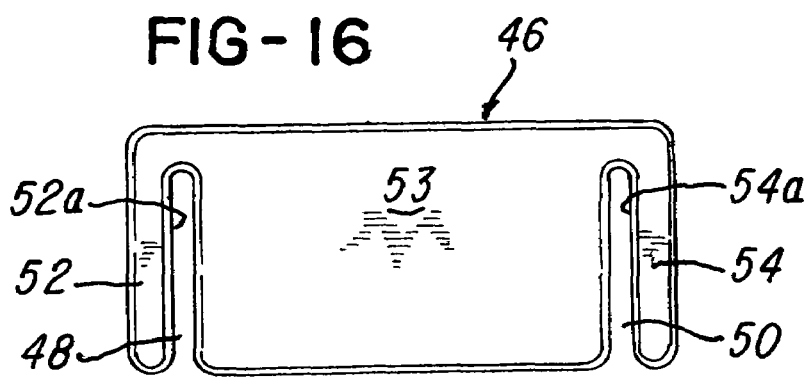

FEED DISH FOR ANIMAL CAGES

The present invention relates to a feed dish and, more particularly, to a feed dish including a mounting system or mounting means for mounting the dish to a cage wall, with the mounting system or mounting means being capable of accommodating cage walls having varying degrees of thickness or depth.

BACKGROUND OF THE INVENTION

It is well known to provide feed dishes for cages containing small birds or animals wherein the dish is adapted to be mounted on the side of a cage. Known feed dishes have utilized a number of different designs and mechanisms for attaching the dishes to the side of a cage. For example, a known mounting structure is provided for engaging between two adjacent vertical elements of a cage lattice structure, and another known mounting structure includes members for hanging the dish from a horizontal extending element of the cage structure. Typically, there is a trade-off between securely mounting the dish or feeder to the side of the cage and providing for ease of removal of the dish, such as may be necessary for refilling or cleaning the dish.

U.S. Pat. No. 5,832,872 discloses one form of a mounting structure integrally formed with the feeding dish.

U.S. Pat. No. 6,199,510 B1, which is issued to the same assignee as the assignee of the present invention and which is incorporated herein by reference and made a part hereof, discloses a feed dish for use in combination with a cage having a cage side formed as a lattice of horizontal and vertical members. The feed dish includes a bowl and mounting structure wherein the mounting structure includes a pair of elongated leg members having enlarged end portions. The mounting structure further includes a slide member having a pair of slots for engaging over the leg members wherein the slide member is retained on the leg members between the bowl and the enlarged portions to retain the bowl in engagement with the side of a cage with the leg members extending through the lattice structure.

One of the problems with the systems of the prior art is that they did not provide for secure mounting to a wall or lattice structure of the cage by a mechanism that was easily and quickly manipulated to mount and dismount the dish thereto and without the use of any rotating, threaded member.

SUMMARY OF THE INVENTION

It is, therefore, an object of the present invention to provide a dish that is easily attached to the side of a cage defined by a lattice structure.

Another object of the invention is to provide a feed dish that is easily attached to the side of a cage, defined by a lattice structure and which can accommodate lattice structures having varying thickness.

It is a further object of the invention to provide a feed dish with a mounting structure or means which is operated with a minimum manipulation while providing a secure mounting for the feed dish and which is adjustable to accommodate lattice structures of varying thickness.

In one aspect, this invention comprises a feed dish for attaching to a feed cage, a bowl, at least one adjustment projection extending from the bowl and for passing through a wall of the feed cage, and a cooperating member for situating on an opposite side of the wall and for slidably engaging the at least one adjustment projection to adjustably secure the bowl to the wall.

In another aspect, this invention comprises a feed dish for use in combination with a cage formed from a lattice of horizontal and vertical wire members, the feed dish comprising a bowl comprising a sidewall, the bowl comprising mounting structure for attaching the bowl to the cage, the mounting structure comprising at least one elongated member extending from the sidewall for extending through the lattice of the cage, the at least one elongated member comprising a plurality of channels defining a plurality of adjustment positions, respectively, for accommodating wire of different gauges, a sliding member comprising at least one slot for receiving the at least one elongated member and for cooperating with at least one of the plurality of channels in order to secure the bowl onto the lattice.

In still another aspect, this invention comprises a feed dish for securing to a cage wall of a cage comprising a bowl having a bowl wall, at least one protrusion extending from the bowl wall, the at least one protrusion comprising a plurality of adjustment areas, and a sliding member for mounting on at least one of the plurality of adjustment areas in order to secure the bowl to the cage wall, the plurality of adjustment areas being spaced to accommodate cage walls of different thickness.

In yet another aspect, this invention comprises a cage and feed dish system, a cage comprising a cage wall, a bowl having a bowl wall, a plurality of protrusions extending from the bowl wall, each of the plurality protrusions comprising a plurality of slots defining a plurality of adjustment positions, respectively, so that the bowl can be mounted on cage walls having different thickness, and a mounting member for mounting on at least one of the plurality of channels in order to secure the bowl to the cage wall.

In another aspect, this invention comprises a feed dish for securing to a cage wall of a cage comprising a bowl comprising a bowl wall, and mounting means for mounting the bowl on the cage wall, the mounting means comprising at least one mounting member that mounts onto at least a portion of the bowl to secure the bowl to the cage wall and that is capable of accommodating cages having cage walls of varying thickness.

These and other objects and advantages of the invention will be apparent from the following description, the accompanying drawing and the appended claims.

BRIEF DESCRIPTION OF THE DRAWINGS

FIG. 1 is a fragmentary view of the feed dish with the mounting structure or means supporting the dish on a wall or side of a cage;

FIG. 2 is an exploded view of the feed dish and sliding member shown in FIG. 1;

FIG. 3 is a fragmentary side view showing details of the bowl and a plurality of extension members or protrusions, which receive and support the mounting member;

FIG. 4 is another exploded view of the feed dish showing various planes and relationships of components;

FIG. 5 is a fragmentary side view showing the adjustability of the mounting structure or means and ability to accommodate walls of varying thickness;

FIG. 6 is a perspective view of the bowl;
FIG. 7 is a plan view of the bowl;
FIG. 8 is a rear view of the bowl;
FIG. 9 is a front view of the bowl;
FIG. 10 is a bottom view of the bowl;
FIG. 11 is a right side view of the bowl;
FIG. 12 is a perspective view of the sliding or locking member;

FIG. 13 is a right side view of the sliding or locking member;

FIG. 14 is a top view of the sliding or locking member;

FIG. 15 is a front view of the sliding or locking member; and

FIG. 16 is a rear view of the sliding or locking member.

DETAILED DESCRIPTION OF THE PREFERRED EMBODIMENT

Referring to FIG. 1, a cage and dish system 10 is shown comprising a cage 12 having a base 14 and a plurality of wires, such as wires 16-24. Note that the wires define a lattice 26 that defines at least one or a plurality of walls, such as walls 28 and 30. Note that the wall 28 lies in a first imaginary plane P1 (FIG. 1).

Referring additionally to FIGS. 2 and 3, a feed dish 34 is shown comprising a first wall 34a, a second wall 34b, a third wall 34c and a fourth wall 34d. The dish 34 also comprises a floor or bottom 36 integrally formed with the said walls 34a-34d. Note that the wall 34a lies in a second imaginary plane P2 (FIG. 4) that is generally parallel to the first plane P1 when the dish 34 is mounted to the cage 12.

As best illustrated in FIGS. 2 and 3, the wall 34a comprises at least one or a plurality of protrusions or adjustment projections 38 and 40 that are generally L-shaped when viewed in cross-section in the embodiment being described. Although not shown, the system 10 may be used with a cage having a solid wall, such as a plastic wall, having an aperture for receiving the projections 38 and 40, as described later herein. Note that the projections 38 and 40 are inserted through the lattice 26 as shown in FIGS. 1, 3 and 5.

Each of the projections 38 and 40 comprise a plurality of channels, such as channels 38a and channels 40a (FIG. 3) that are defined by a plurality of teeth 42 and 44, respectively. The channels 38a and 40a receive and support a cooperating member or sliding member 46 that is received on at least one or a plurality of the protrusions or projections 38 and 40 in a manner described later herein. In the embodiment being described, the at least one or plurality of protrusions 38 and 40 are integrally formed into and project from wall 34a to define wall portions 38c and 40c as shown. Bowl 34 is molded from a suitable plastic, such as ABS plastic.

Note that the sliding member 46 comprises a handle 46a (FIGS. 2, 12-15) for moving the sliding member 46 in the direction of double arrow A (FIG. 2) to facilitate mounting or dismounting the bowl 34 from the wall 28. Each of the at least one protrusion or projection members 38 and 40 terminate in a respective flange member 38b and 40b and an enlarged portion or stop at an ends thereof and distal from the wall 34a of bowl 34. The flange members 38b and 40b each define a generally planar wall extending horizontally in a perpendicular direction from the leg members 38 and 40.

Referring now to FIGS. 1, 12, 15 and 16, the sliding member 46 comprises one or a plurality of slots. For ease of illustration, the embodiment will be shown and described with two slots 48 and 50, which receive the at least one protrusion or projection member 38 and 40, respectively. The sliding member 46 comprises leg portions 52 and 54 that cooperate with an integral wall portion 53 to define the slots 48 and 50. The leg portions 52 and 54 comprise inner edge 52a and inner edge 54a, respectively. Note that the inner edges 52a and 54a are received in one of the plurality of channels 38a or 40a, respectively, of at least one protrusion or projection members 38 and 40 when the sliding member 46 is slidably mounted on the at least one protrusion or projection member 38 and 40. It should be understood that the slots 48 and 50 are dimensioned such that when the sliding member 46 is mounted on the protrusions 38 and 40, there is a "snug slip fit" or "zero tolerance fit" that causes the sliding member 46 to become locked onto the at least one protrusions or projections 38 and 40. This, in turn, prevents the sliding member 46 from becoming disconnected from the bowl 34. Also, the legs 52 and 54 have some elasticity so they can move in a lateral direction as viewed in FIG. 16.

In the embodiment being described, the protrusions 38 and 40 comprise the wall portion 38c and wall portion 40c, respectively, that lie in a third plane P3 (FIG. 4) and fourth plane P4 (FIG. 4), respectively. Note that when the sliding member 46 is mounted on the protrusions 38 and 40, the sliding member 46 lies in a fifth plane P5 that is generally parallel to the plane P1 of the lattice 26 and plane P2 of the cage wall 34a. Moreover, the plane P5 is generally perpendicular to the planes P3 and P4 (FIG. 2) in which at least one protrusions or projections 38 and 40 lie.

The projections 38 and 40 support the cooperating member 46 and define a wall-receiving area 49 (FIGS. 3 and 5) for receiving a wall 28 defined by a lattice or for receiving a solid wall (not shown). Note that the wall 34a may be provided with one or more optional integral stops or detents 56 (FIG. 4) for use with the lattice 26 that provides a stop or movement restrictor for engaging wire 16 when the bowl 34 is moved in the direction of arrow B (FIG. 3) to facilitate minimizing movement of bowl 34.

When it is desired to mount the bowl 34 onto cage 12, the bowl 34 is positioned at the desired height and location and the protrusions 38 and 40 are inserted through the lattice 26 that defines the cage wall 28 of cage 12. Next, the user simply positions or moves the sliding member 46 downward (as viewed in FIGS. 2 and 4) until the slots 48 and 50 receive the protrusions 38 and 40, respectively. In the embodiment being described, the user situates the surface 46d of sliding member 46 (FIG. 3) against the cage wall 28 and slides the sliding member 46 downward as mentioned so that the edges 52a and 54a are received in at least one of the channels 38a and channels 40a, respectively. Note that the wall 34a of bowl 34 is positioned in engagement with the cage wall 28 of cage 12. As the sliding member 46 is moved downward into position (as viewed in FIGS. 2 and 3), the wall 34a engages the cage wall 28 of cage 12 and the surface 46d of sliding member 46 engages an opposite side of the cage wall 28 of cage 12 when the protrusions 38 and 40 are received in slots 48 and 50. This, in turn, causes the sliding member 46 to become retained on and locked to the bowl 34, such that the cage wall 28 is sandwiched therebetween, as shown in FIG. 1, thereby retaining the bowl 34 on the cage wall 28.

In general, removal of the dish 34 from the cage wall 28 is the reverse of the installation. Normally, a person holds the dish 34 on one side of the lattice 26 and then grips the portion 46a of sliding member 46 and moves it in an upward direction (as viewed in FIGS. 2 and 3) until the protrusions 38 and 40 exit the slots 48 and 50, respectively, which in turn, causes the edges 52a and 54a exit their channels 38a and 40a, respectively. The bowl 34 may then be removed from cage 12 and/or repositioned thereon.

Advantageously, when it is desired to place the bowl 34 on cage 12 having a cage wall 28 defining a different dimension (such as a different thickness), the above installation procedure is repeated. Note that the protrusions 38 and 40 comprise the plurality of channels 38a and 40a, that define a plurality of adjustment positions, respectively, thereby enabling the bowl 34 to be mounted easily onto cages having walls of different dimensions. As illustrated in FIGS. 3 and 5, the system 10 may be used with cage walls 28 of different thickness. In this regard, it should be understood that the bowl 34 may be mounted on a cage 12 that is not defined by a lattice, but rather, is defined by a solid wall (not shown), such as a plastic wall, that comprises an opening capable of receiving the at least one of the plurality protrusions 38 and 40 and that is capable of being "sandwiched" in the area 49 (FIGS. 3 and 5) between wall 34a and surface 46d of sliding member 46.

Advantageously, this system and method provide convenient means for securely mounting a feed dish to a structure, such as an animal cage, travel cage or the like and that has a mechanism that is easily and quickly manipulated to mount and dismount the dish onto a wall of the cage, but yet is also capable of accommodating cages having walls of different thickness or that are defined by lattices made from wire having different gauges. Note that the invention comprises a convenient and easily manipulated mounting structure for mounting the feed dish 34 to the cage 12. It should be apparent that although the present mounting structure provides an easily manipulated securing means and mounting means for mounting the dish to the cage, the ease of installation does not detract from the security of the installation and the feed dish 34, which will remain securely in position until such time as the user desires to remove the dish 34 from the cage 12 by removing the sliding member 46 from at least one or plurality of protrusions 38 and 40.

While the form of apparatus herein described constitutes a preferred embodiment of the invention, it is to be understood that the invention is not limited to this precise form of apparatus in system in that changes may be made therewith without departing from the true scope and spirit of the invention which is defined in the following claims.

What is claimed is:

1. A feed dish for use in combination with a cage formed from a lattice of horizontal and vertical wire members, said feed dish comprising:
    a bowl comprising a sidewall, said bowl a comprising mounting structure for attaching the bowl to said cage;
    said mounting structure comprising:
    two elongated members extending from said sidewall for extending through the lattice of the cage, said elongated members each comprising a plurality of channels defining a plurality of adjustment positions, respectively, for accommodating wire of different gauges;
    a sliding member comprising two slots for receiving said two elongated members and for cooperating with at least one of said plurality of channels in each of said members in order to secure said bowl onto said lattice, at least a portion of said sliding member being slidably and non-threadably mounted on said elongated members to secure said bowl to the lattice; and
    wherein said elongated members each comprise a plurality of spaced teeth defining said plurality of channels.

2. The feed dish as recited in claim 1 wherein said sliding member lies in a plane that is generally parallel to a plane of a wall after said member is mounted on the two elongated members.

3. The feed dish as recited in claim 1 wherein said mounting structure comprises a plurality of elongated members extending from said sidewall, each of said plurality of elongated members each comprising a plurality of channels defining a plurality of adjustment positions, respectively, for accommodating lattices of different thickness and said sliding member comprising a plurality of slots for receiving said plurality of elongated members, respectively.

4. The feed dish as recited in claim 3 wherein said lattice defines a wall that lies in a first plane and said plurality of elongated members lie in a second plane and third plane, respectively;
    said second and third planes being generally parallel to each other and generally perpendicular to said first plane when said sliding member is mounted on the elongated members.

5. The feed dish as recited in claim 3 wherein said sliding member engages the elongated members in linear sliding movement such that the slots and the plurality of channels cooperate to lock the feed dish onto the lattice.

6. The feed dish as recited in claim 3 wherein said sliding member comprises a plurality of slots and the feed dish comprises a plurality of elongated members; said plurality of slots receiving said plurality of elongated members in linear sliding movement such that said sliding member and said plurality of elongated members cooperate to lock said dish onto the lattice.

7. The feed dish as recited in claim 1 wherein said lattice defines a wall that lies in a first plane and said elongated members lies in a second plane that is generally perpendicular to said first plane when said sliding member is mounted on said elongated members.

8. The feed dish as recited in claim 7 wherein said plurality of channels also lie in said second plane and are spaced and generally parallel to each other and to said first plane when said sliding member is mounted on said elongated members.

9. The feed dish as recited in claim 7 wherein said plurality of channels also lie in said second plane and are generally parallel to each other and generally perpendicular to said first plane when said sliding member is mounted on said elongated members.

10. A feed dish for use in combination with a cage formed from a lattice of horizontal and vertical wire members, said feed dish comprising:
    a bowl comprising a sidewall, said bowl comprising a mounting structure for attaching the bowl to said cage;
    said mounting structure comprising:
    two elongated members extending from said sidewall for extending through the lattice of the cage, the elongated members each comprising a plurality of channels defining a plurality of adjustment positions, respectively, for accommodating wire of different gauges;
    a sliding member comprising two slots for receiving said elongated members and for cooperating with the plurality of channels in order to secure said bowl onto said lattice, at least a portion of said sliding member being slidably and non-threadably mounted on the elongated members to secure said bowl to the lattice;
    wherein said mounting structure comprises a plurality of elongated members extending from said sidewall, each of said plurality elongated members comprising a plurality of channels defining a plurality of adjustment positions, respectively, for accommodating lattices of different thickness and said sliding member comprising a plurality of slots for receiving said plurality of elongated members, respectively; and
    wherein said plurality of elongated members each comprises a plurality of spaced teeth defining said plurality of channels.

11. A feed dish for use in combination with a cage formed from a lattice of horizontal and vertical wire members, said feed dish comprising:
    a bowl comprising a sidewall, said bowl comprising a mounting structure for attaching the bowl to said cage;
    said mounting structure comprising:

two elongated members extending from said sidewall for extending through the lattice of the cage, the elongated members each comprising a plurality of channels defining a plurality of adjustment positions, respectively, for accommodating wire of different gauges;

a sliding member comprising two slots for receiving said elongated members and for cooperating with the plurality of channels in order to secure said bowl onto said lattice, at least a portion of said sliding member being slidably and non-threadably mounted on the elongated members to secure said bowl to the lattice;

wherein said mounting structure comprises a plurality of elongated members extending from said sidewall, each of said plurality of elongated members comprising a plurality of channels defining a plurality of adjustment positions, respectively, for accommodating lattices of different thickness and said sliding member comprising a plurality of slots for receiving said plurality of elongated members, respectively;

wherein said sliding member engages the elongated members in linear sliding movement such that the slots and plurality of channels cooperate to lock said bowl onto said lattice; and wherein said elongated members comprise a plurality of spaced teeth defining said plurality of channels.

12. A feed dish for use in combination with a cage formed from a lattice of horizontal and vertical wire members, said feed dish comprising:

a bowl comprising a sidewall, said bowl comprising a mounting structure for attaching the bowl to said cage;

said mounting structure comprising:

two elongated members extending from said sidewall for extending through the lattice of the cage, the elongated members each comprising a plurality of channels defining a plurality of adjustment positions, respectively, for accommodating wire of different gauges;

a sliding member comprising two slots for receiving said elongated members and for cooperating with the plurality of channels in order to secure said bowl onto said lattice, at least a portion of said sliding member being slidably and non-threadably mounted on the elongated members to secure said bowl to the lattice;

wherein said mounting structure comprises a plurality of elongated members extending from said sidewall, each of said plurality of elongated members comprising a plurality of channels defining a plurality of adjustment positions, respectively, for accommodating lattices of different thickness and said sliding member comprising a plurality of slots for receiving said plurality of elongated members, respectively;

wherein said sliding member comprises a plurality of slots and said bowl comprises a plurality of elongated members; said plurality of slots receiving said plurality of elongated members in linear sliding movement such that said sliding member and said plurality of elongated members cooperate to lock said bowl onto said lattice; and wherein said plurality of elongated members each comprises a plurality of spaced teeth defining said plurality of channels.

13. A feed dish for securing to a cage wall of a cage comprising:

a bowl having a bowl wall;

two protrusions extending from said bowl wall, said protrusions comprising a plurality of adjustment areas; and a sliding member for slidably and non-threadably mounting on each protrusion on at least one of said plurality of adjustment areas in order to secure said bowl to said cage wall;

said plurality of adjustment areas being spaced to accommodate cage walls of different thickness and wherein said protrusions extend from said bowl wall for extending through said cage wall of said cage, said said protrusions comprising said plurality of adjustment areas that define a plurality of adjustment positions, respectively, for accommodating cage walls of different thickness;

said sliding member comprising two channels or slots having at least one engaging edge each for receiving said protrusions such that said engaging edge may be received in each channel or slot in order to secure said bowl to said cage wall; and wherein said protrusions comprise a plurality of spaced teeth defining a plurality of channels, respectively.

14. The feed dish as recited in claim 13 wherein a mounting structure comprises a plurality of protrusions extending from a bowl wall, each of said plurality of protrusions comprising a plurality of channels defining a plurality of adjustment areas that define a plurality of adjustment positions, respectively, for accommodating cage walls of different sizes and said sliding member comprising a plurality of slots for receiving said plurality of protrusions, respectively.

15. The feed dish as recited in claim 14 wherein said plurality of slots receive said plurality of protrusions, respectively, in linear sliding movement such that said sliding member and said plurality of protrusions cooperate to lock a bowl onto the cage walls.

16. The feed dish as recited in claim 13 wherein said cage wall lies in a first plane and a plurality of protrusions comprise a first protrusion that lies in a second plane and a second protrusion that lies in a third plane, respectively;

said second and third planes being generally parallel to each other and generally perpendicular to said first plane when said feed dish is mounted on said cage.

17. The feed dish as recited in claim 16 wherein said plurality of channels also lie in said second plane and are generally parallel to each other and generally perpendicular to said first plane.

18. The feed dish as recited in claim 13 wherein said sliding member engages said protrusions in linear sliding movement such that the slots and said plurality of channels cooperate to lock said bowl onto said cage wall.

19. A feed dish for securing to a cage wall of a cage comprising:

a bowl having a bowl wall;

two protrusions extending from said bowl wall, said protrusions comprising a plurality of adjustment areas; and a sliding member for slidably and non-threadably mounting on said protrusions on at least two of said plurality of adjustment areas in order to secure said bowl to said cage wall;

said plurality of adjustment areas being spaced to accommodate cage walls of different thickness and wherein said protrusions extend from said bowl wall for extending through said cage wall of said cage, said protrusions comprising said plurality of adjustment areas that define a plurality of adjustment positions, respectively, for accommodating cage walls of different thickness;

said sliding member comprising two channels or slots each having at least one engaging edge for receiving said protrusions such that said at least one engaging edge may be received in said channels or slots in order to secure said bowl to said cage wall;

wherein a mounting structure comprises a plurality of protrusions extending from said bowl wall, each of said plurality of protrusions comprising a plurality of channels defining said plurality of adjustment areas that define a plurality of adjustment positions, respectively, for accommodating cage walls of different sizes and said sliding member comprising two slots for receiving said plurality of protrusions, respectively; and wherein said plurality of protrusions each comprises a plurality of spaced teeth defining a plurality of channels, respectively.

20. A feed dish for securing to a cage wall of a cage comprising:

a bowl having a bowl wall;

two protrusions extending from said bowl wall, said protrusions comprising a plurality of adjustment areas; and a sliding member for slidably and non-threadably mounting on said protrusions on at least two of said plurality of adjustment areas in order to secure said bowl to said cage wall;

said plurality of adjustment areas being spaced to accommodate cage walls of different thickness and wherein said protrusions extend from said bowl wall for extending through said cage wall of said cage, said protrusions comprising said plurality of adjustment areas that define a plurality of adjustment positions, respectively, for accommodating cage walls of different thickness;

said sliding member comprising two channels or slots each having at least two engaging edges for receiving said protrusions such that said at least one engaging edge may be received in each channel or slot in order to secure said bowl to said cage wall;

wherein said protrusions comprise a plurality of spaced teeth defining a plurality of channels, respectively;

wherein said sliding member engages said protrusions in linear sliding movement such that the slots and said plurality of channels cooperate to lock said bowl onto said cage wall; and wherein each protrusion comprises a plurality of spaced teeth defining a plurality of channels.

21. A feed dish for securing to a cage wall of a cage comprising:

a bowl having a bowl wall;

two protrusions extending from said bowl wall, said protrusions comprising a plurality of adjustment areas; and a sliding member for slidably and non-threadably mounting on said protrusions on at least two of said plurality of adjustment areas in order to secure said bowl to said cage wall;

said plurality of adjustment areas being spaced to accommodate cage walls of different thickness and wherein said protrusions extend from said bowl wall for extending through said cage wall of said cage, said protrusions comprising said plurality of adjustment areas that define a plurality of adjustment positions, respectively, for accommodating cage walls of different thickness;

said sliding member comprising two channels or slots each having at least two engaging edge for receiving said protrusions such that said at least one engaging edge may be received in each channel or slot in order to secure said bowl to said cage wall;

wherein a mounting structure comprises a plurality of protrusions extending from said bowl wall, each of said plurality of protrusions comprising a plurality of channels defining said plurality of adjustment areas that define a plurality of adjustment positions, respectively, for accommodating cage walls of different sizes and said sliding member comprising a plurality of slots for receiving said plurality of protrusions, respectively;

wherein said plurality of slots receive said plurality of protrusions, respectively, in linear sliding movement such that said sliding member and said plurality of protrusions cooperate to lock said bowl onto said cage wall; and wherein said plurality of protrusions each comprises a plurality of spaced teeth defining said plurality of channels.

* * * * *